United States Patent
Ryder

[15] 3,665,800
[45] May 30, 1972

[54] SNAP-IN FASTENER AND APPARATUS FOR MOLDING SAME

[72] Inventor: Francis E. Ryder, Mt. Prospect, Ill.

[73] Assignee: Value Engineered Components, Inc., Lake Zurich, Ill.

[22] Filed: Mar. 20, 1970

[21] Appl. No.: 21,444

[52] U.S. Cl. ................................................85/5, 249/158
[51] Int. Cl. .............................................................F16b 21/08
[58] Field of Search ............................85/5, 3 S, 80, 5 R; 24/73 D, 24/73 HS

[56] References Cited

UNITED STATES PATENTS

| | | | |
|---|---|---|---|
| 2,943,373 | 7/1960 | Rapata | 85/80 |
| 2,882,780 | 4/1959 | Edwards | 85/5 R |
| 861,573 | 7/1907 | Budd | 85/5 R |
| 2,650,516 | 9/1953 | Poupitch | 85/5 R |
| 3,093,027 | 6/1963 | Rapada | 85/5 R |

Primary Examiner—Edward C. Allen
Attorney—Olson, Trexler, Wolters & Bushnell

[57] ABSTRACT

The present invention relates generally to improvements in fasteners adapted for snap insertion within a work aperture, and more particularly to improvements in snap-fasteners of multi-piece form. The embodiment of the invention disclosed herein comprises a headed shank member and a sleeve member telescopically associated therewith. The sleeve member is secured in pre-determined spaced relation with respect to the work engaging side of the head and incorporates a laterally yieldable section to permit telescopic association thereof with a work aperture. The spacing of the sleeve with respect to the head is dependent upon a pre-selected lineal dimension of the shank, such dimension being determined by the thickness of the work to which the fastener is to be applied.

8 Claims, 9 Drawing Figures

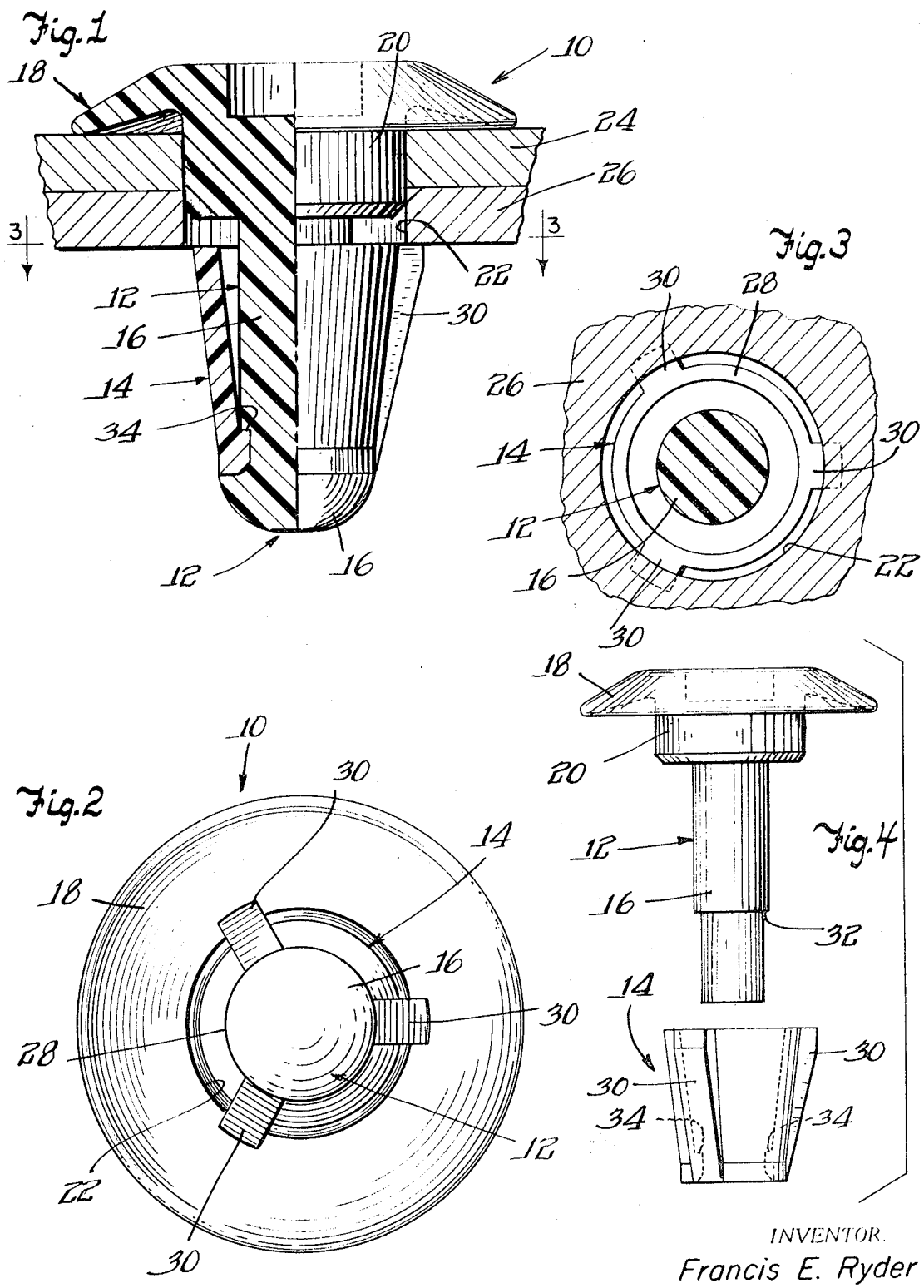

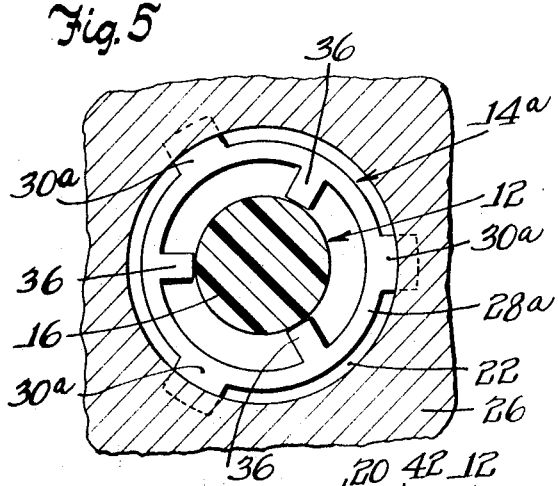
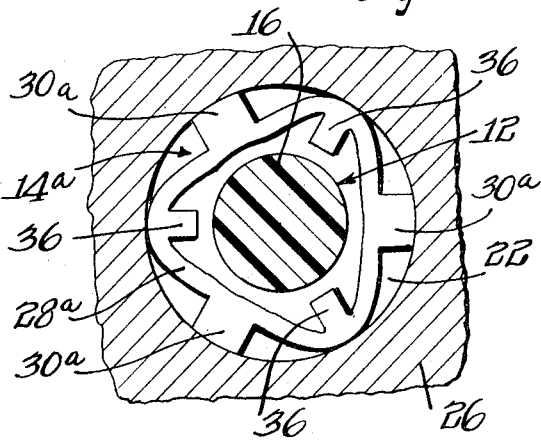
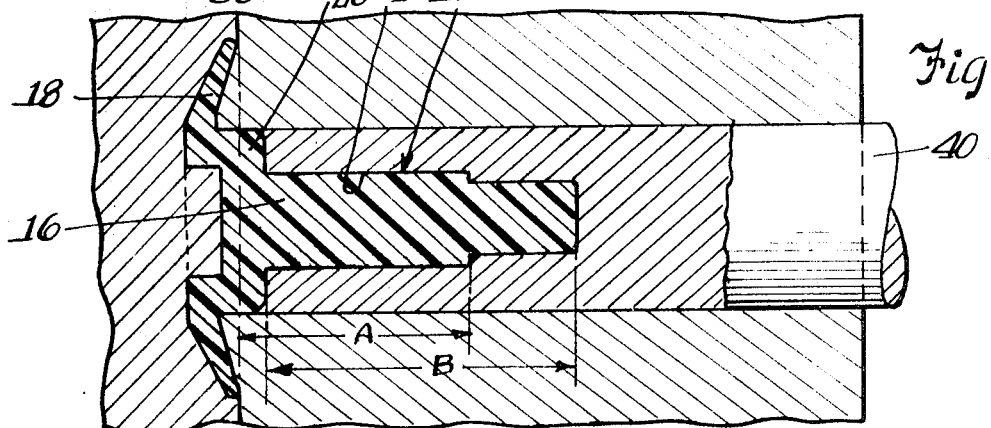
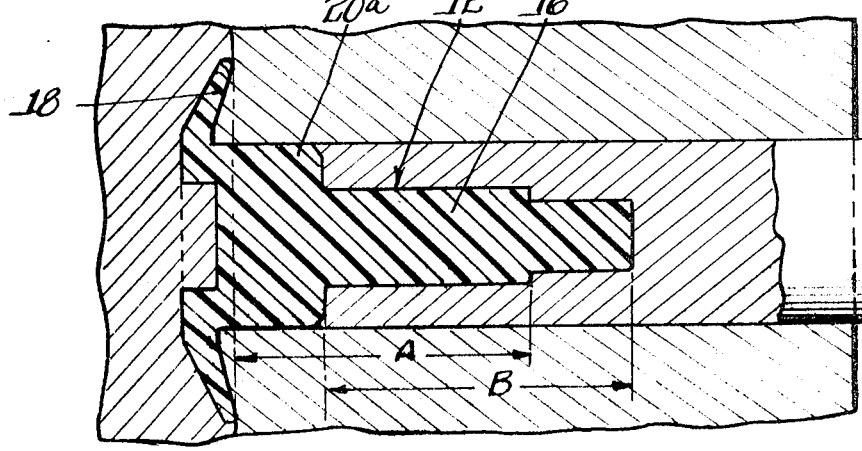
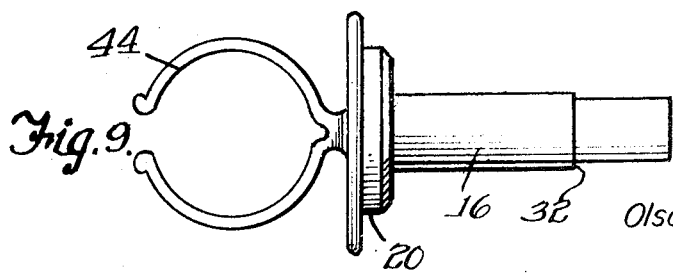
INVENTOR.
Francis E. Ryder
BY
Olson, Trexler, Wolters & Bushnell
Att'ys

SNAP-IN FASTENER AND APPARATUS FOR MOLDING SAME

Snap-in type fasteners have heretofore been employed wherein a one-piece molded structure includes a head, a shank, and an entering extremity formed with laterally yieldable shoulder to permit telescopic association of the one-piece fastener with an apertured work-piece. Obviously, the axial spacing of the shoulder with respect to the work engaging side of the head is predetermined to accommodate a workpiece of corresponding pre-determined thickness. To provide, as by molding, a similar fastener for a workpiece of different thickness necessitates the provision of a separate die in which the cavity details for the head, shank length, and entering extremity of the resulting fastener must be incorporated. It has been found, for example, that overthickness of a workpiece such as a panel may result from the presence of a burr, paint, plating, etc. Under such circumstances, it may be impossible to employ the one-piece fastener which was originally designed for a given workpiece thickness. To inventory a supply one-piece type fasteners to accommodate work-thickness variations of the type just referred to would be most impractical and exceedingly costly.

It is one of the important objects of the present invention to provide a multi-piece fastener of the type referred to above, which is so constructed that the axial spacing of the work engaging side of a fastener head may be produced without the necessity of providing a completely new or separate die for each size.

It is a further object of the present invention to provide a multi-piece snap-in fastener of the type referred to above, wherein workpieces of different thicknesses may be accommodated by the simple expediency of altering the length of the shank portion of the fastener.

Another object of the present invention is to provide a novel and very practical snap-in fastener in which a sleeve member or thimble telescopically associated with the fastener shank may be of uniform size and contour regardless of the workpiece thickness with which it is to be used. Thus a quantity of such parts may be inventoried for use with complementary shank members of varying lengths.

The present invention also contemplates a new and improved injection type molding apparatus for molding the shank section of a two-piece fastener whereby shank sections of varying lengths may be molded very economically.

The foregoing and other objects and advantages will be more apparent from the following detailed description when considered in connection with the accompanying drawings wherein:

FIG. 1 discloses a two-piece fastener, shown partly in section, which is representative of one-embodiment of the present invention, said fastener being shown in telescopic association with a work aperture;

FIG. 2 discloses the fastener as viewed from the bottom of FIG. 1;

FIG. 3 is a fragmentary sectional view taken substantially along the line 3—3 of FIG. 1;

FIG. 4 is an elevational view disclosing the fastener parts in separated relation;

FIG. 5 is a detailed, sectional view similar to FIG. 3 disclosing a modified form of sleeve wherein circumferentially distributed ribs extending radially inwardly from the inner periphery of the sleeve engage the outer periphery of the shank section and thus lend lateral stability to the sleeve;

FIG. 6 is a detailed sectional view similar to FIG. 5, showing the temporarily distorted condition of the sleeve member during the initial insertion thereof within a work aperture;

FIG. 7 is a central sectional view of the headed shank section in association with the mold cavity and the longitudinally adjustable central core member;

FIG. 8 is a view similar to FIG. 7, disclosing the core member shifted to the right whereby to enable molding a headed shank member of increased length; and FIG. 9 discloses a snap-in fastener having a head of modified form.

Referring now to the drawings more in detail, wherein like numerals have been employed to designate similar parts throughout the various figures, it will be seen that a two-piece fastener which is representative of one embodiment of the present invention is designated generally by the numeral 10. The fastener 10 is composed of two parts, namely: a headed shank member 12 and a sleeve or thimble member 14. The shank member 12 includes a shank section 16 and a head section 18 molded integral therewith. The head section 18 as shown in FIGS. 1 and 4, is formed so as to provide an axially flexible outer margin. Immediately beneath the head 18 is an enlarged shank portion 20, the diameter of which approximates the diameter of a complementary aperture 22 in a pair of abutting worksheets or panels 24 and 26.

The sleeve or thimble 14 has a tapered body portion 28 and three equally spaced longitudinal ribs 30 projecting radially outward from the periphery of the tapered body 28. The smaller extremity of the sleeve 14 has an internal diameter conforming substantially with the diameter of the entering extremity of the shank member 16. A shoulder 32 on the shank member 16 cooperates with a complementary internal shoulder 34 of the sleeve 14 to limit the extent to which the sleeve may be telescopically associated with the shank member. When the shoulders 32 and 34 are in abutment, the portion of the shank member extending beyond the extremity of the sleeve 14 may be upset so as to provide an annular interlock with the entering edge of the sleeve as clearly shown in FIG. 1. When thus assembled, the sleeve 14 is secured in predetermined spaced relation with the underside of the head 18.

It will be noted that the three uniformly spaced ribs 30 at the trailing extremity of the sleeve 14, normally define a circle which is larger than the work aperture 22. Each of the ribs 30 taper toward the entering end of the fastener, and in fact, merge with the external periphery of the sleeve. Thus as the preassembled fastener elements are initially inserted within the work aperture 22, the ribs 30 will be forced radially inward until the head 18 yieldably engages the outer surface of the work panel 24. Upon clearing the aperture 22, the locking ribs 30 will spring radially outwardly to their normal position shown in FIGS. 1 to 4 inclusive, thereby firmly securing the work panels 24 and 26 in abutting relation. The shank enlargement 20 maintains the co-axial relation of the fastener with the aperture, and affords the required degree of shear strength. Both the shank member 16 and the sleeve 14 are preferably formed of suitable plastic material which affords the desired degree of strength and firm resiliency.

In FIGS. 5 and 6 a fastener sleeve or thimble of slightly modified form is shown. This sleeve is designated generally by the numeral 14a, and includes a tapered body 28a and equally spaced ribs 30a, corresponding with the previously mentioned body and ribs 28 and 30 respectively. The only structural difference between the sleeve 14 and the sleeve 14a is in the provision of inwardly projecting, uniformly spaced protuberances or ribs 36. In their normal relation the inner extremities of the ribs 36 define a circle having a diameter substantially equal to the diameter of the shank member 16. During the initial telescopic assembly of the sleeve 14a, with the work aperture 22, the engagement of the outer surfaces of the ribs or longitudinal protuberances 30 with the wall defining the aperture 22 causes the tapered body 28a to assume the shape illustrated in FIG. 6. Thus the inner extremities of the protuberances 36 are out of engagement with the periphery of the shank member. However, when the fastener has been completely inserted, the ribs 36a spring outwardly and the ribs or protuberances 36 spring inwardly, so as to occupy the position shown in FIG. 5. The engagement of the protuberances 36 with the periphery of the shank counteracts any tendency for the sleeve or thimble 14a to tilt with respect to the shank axis. In other words, the sleeve is maintained in axial alignment once it has been completely inserted within the work aperture.

One of the distinct advantages of the present invention resides in the provision of a sleeve or thimble which need not be varied in size or contour for accommodating work of various thicknesses. As previously mentioned, snapin fasteners of the one-piece molded type present the disadvantage of requiring a completely separate mold or die for each variation in space between the head which engages one side of the work and the shoulder engaging the opposite side of the work. To accomplish this the present invention contemplates the use of shank members of varying length to accommodate differences in work thickness. In FIG. 7 a mold is disclosed which includes a section 38 which is longitudinally apertured to accommodate a core member 40. The extremity of the core 40 is provided with a cavity 42 shaped in conformity with the shank section 16. The distance indicated by the letter A in FIG. 7 is critical because it is this dimension which ultimately determines the space between the underside of the fastener head and the adjacent extremity of the sleeve. To provide a fastener which will accommodate work of increased thickness, and it is only necessary to shift the core member 40 to the right as shown in FIG. 8, thereby increasing the distance A. The distance indicated by the letter B remains constant. It will be apparent that when the dimension A is increased as shown in FIG. 8, the axial extent of the shank enlargement also increases. This axial enlargement in FIG. 8, designated by the numeral 20a.

Obviously, the present invention is not limited to a fastener having the head structure shown in FIGS. 1 to 8 inclusive, but contemplates other shapes and configurations. In FIG. 9, for example, the head of the fastener includes a section 44 for resiliently gripping a conduit or cable. In all other respects the fastener shank member shown in FIG. 9 is similar to the previously described structure.

From the foregoing description it will be appreciated that the present invention contemplates a multi-piece snap-in type fastener of very practical design which is readily adaptable for accommodating work of varying thickness. By practicing the teaching of the present invention, including the simple expedient of varying the position of the core within the longitudinal opening in the mold, the cost of producing fasteners is reduced to a minimum. The shear strength and lateral stability of the fastener shank is increased by the provision of the enlarged shank portion, and as the thickness of the work increases, the length of the enlarged shank portion also increases. The sleeve is secured against tilting or canting with respect to the shank by the longitudinal protuberances or ribs on the inner wall of the sleeve. Thus the lateral stability of the fastener within a work aperture is assured.

I claim:

1. A snap-in type composite fastener for telescopic association as a unit with a work aperture, including a shank, an integral head section at one extremity thereof providing a work engaging surface, peripheral shoulder means on said shank spaced axially from said work engaging surface and facing toward the entering end of the shank, an open ended resilient sleeve member having a circumferentially continuous periphery telescopically associated with said shank and with the periphery of the sleeve member tapering from a larger dimension adjacent the head to a smaller dimension adjacent the entering end of the shank, internal shoulder means adjacent the entering extremity of said sleeve member abutting the aforesaid peripheral shoulder means to position said sleeve a predetermined distance from said work engaging surface and to prevent shifting of the sleeve member toward the head, laterally yieldable peripheral work engaging protuberant shoulder means at the trailing end of said sleeve spaced a predetermined distance from the aforesaid work engaging surface, said laterally yieldable shoulder means normally projecting radially outwardly beyond a circumference defined by the maximum diameter of said shank, and abutment means integral with the shank and abruptly angled to at least approach a position generally normal to the shank axis for engaging a complemental surface on the sleeve member in advance of the smaller dimension thereof to prevent unauthorized axial separation thereof from the entering extremity of the shank and thus prevent removal of the shank from the sleeve member in the direction of the larger diameter thereof.

2. A snap-in type fastener for telescopic association with a work aperture as set forth in claim 1, wherein the shank includes an enlargement adjacent the head conforming substantially with the size of the work aperture which is to accommodate the fastener.

3. A snap-in type fastener for telescopic association with a work aperture as set forth in claim 1, wherein the outer margin of the head section is yieldable axially to facilitate aggressive impingement of the head with a work surface upon complete insertion of the fastener shank within a work aperture.

4. A snap-in type fastener for telescopic association with a work aperture as set forth in claim 1, wherein the laterally yieldable work engaging shoulder means comprise radial protuberances circumferentially spaced uniformly.

5. A snap-in type fastener for telescopic association with a work aperture as set forth in claim 1, wherein protuberant means extend radially inwardly from the sleeve for engaging the periphery of the shank.

6. A snap-in type fastener for telescopic association with a work aperture as set forth in claim 5, wherein the protuberant means extending inwardly from the sleeve comprise elements which are uniformly spaced circumferentially and are located intermediate laterally yieldably circumferentially spaced peripheral work engaging shoulders extending radially outwardly from the sleeve body.

7. A snap-in type fastener as claimed in claim 1, wherein axially extending external ribs on the sleeve member present the laterally yieldable work engaging shoulder means.

8. A snap-in type fastener as claimed in claim 7, wherein the ribs taper inwardly substantially to the smaller dimension of the sleeve member.

* * * * *